C. F. WENDLAND.
SHOCK AND SOUND ARRESTER.
APPLICATION FILED OCT. 26, 1916.
1,240,521. Patented Sept. 18, 1917.
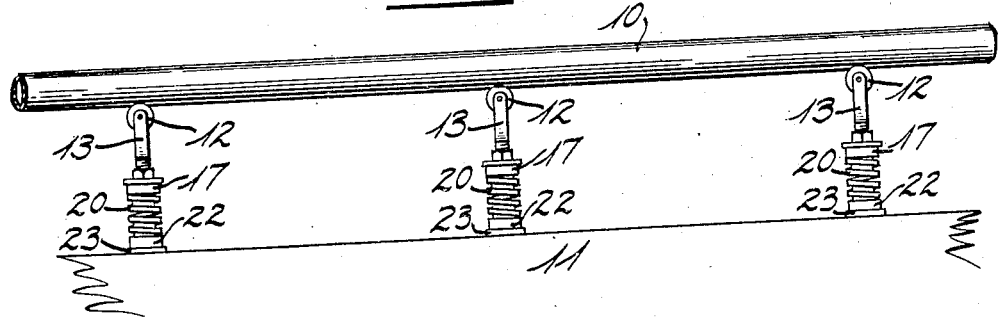
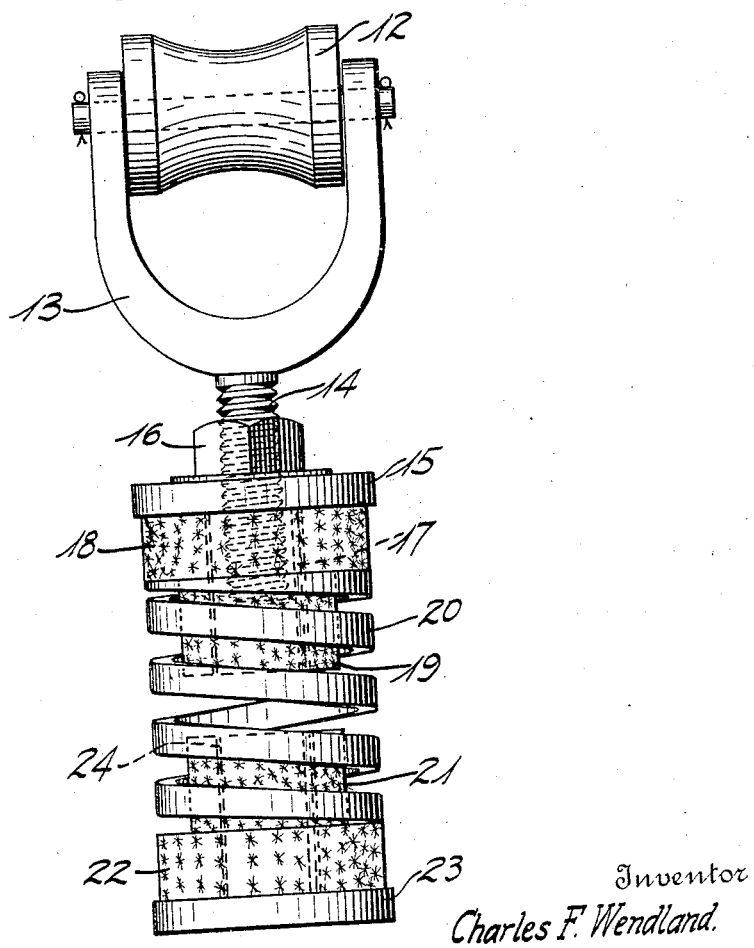
Inventor
Charles F. Wendland.
By His Attorney
George F. Scull

UNITED STATES PATENT OFFICE.

CHARLES F. WENDLAND, OF BROOKLYN, NEW YORK.

SHOCK AND SOUND ARRESTER.

1,240,521.  Specification of Letters Patent.  Patented Sept. 18, 1917.

Application filed October 26, 1916. Serial No. 127,970.

*To all whom it may concern:*

Be it known that I, CHARLES F. WENDLAND, a citizen of the United States, residing at Brooklyn, in the county of Kings, in the State of New York, have invented certain new and useful Improvements in Shock and Sound Arresters; and I do declare the following to be a full, true, and exact description of the said invention, such as will enable others skilled in the art to which it appertains to make and use the same.

This invention relates to a device by which vibration between a body and its supports may be absorbed so as to eliminate such vibrations from a building or the like and so that any sounds occurring in the body so supported may not be transmitted to such building or the like and, more particularly, a means by which a pipe or like may be supported so that the effects of water or steam hammer or other causes of noisy vibrations may have no effect on the building in which such pipe is supported.

With this and other objects in view, my invention consists of certain novel features and construction and arrangements of parts, as will be more fully described and pointed out in the appended claim.

In the drawing, Figure 1 is a side elevation of the form of my novel arrangement which I have chosen for purposes of illustration, in which a number of supports are shown supporting a pipe from a beam or the like.

Fig. 2 is a side elevation of one form of support which I have chosen to illustrate my invention.

The corresponding parts are referred to both in the drawings and in the specification by similar reference characters.

In the drawings, 10 represents a pipe and 11 a diagrammatic representation of the beam or other form of support.

12—12 are rollers having suitably curved faces to conform to the curvature of the pipe.

The roller 12 is supported in a yoke 13 having a screw threaded stem 14 which enters a member 15, being supported thereon by an adjusting nut 16. Preferably the member 15 is provided with a centering projection 17 extending inside a resilient member 18, preferably provided with a projection 19. Over this projection 19 extends one end of a spring 20, the other end of the spring 20 extending over a projection 21 of a resilient member 22 resting on a supporting member 23, also preferably provided with a projection 24 extending inside the opening in the member 22.

In use, as many of the devices shown in Fig. 2 as may be required, are provided and spaced beneath the pipe to be supported.

By adjusting the nut 16, each of such devices may be given only its proper amount of the total weight to be supported.

It will be seen that by the arrangement which I have provided any vibration in the pipe 10 will be absorbed by the resilient members which I have provided, these being the members 18 and 22, which may be of cork, rubber or like, and the spring 20. Moreover, by providing the rollers 12, the pipe 10 will be free to move as may be necessary, if it should expand or contract, without in any way disturbing its supports—and by providing the adjustment by the nut 16, it will be seen that each support can be arranged so that none will carry an undue portion of the load. The resilient members 18 and 22 serve to absorb the vibrations of small amplitude which produce noise, while the spring 20 will absorb the longer vibrations or oscillations of the pipe such as may arise by reason of the connection of the pipe to any source of such vibrations, as, for instance, a steam engine or the like.

By combining the two kinds of resilient members, the solid rubber or cork members 18 and 22 and the metallic spring 20, I provide a structure which will absorb practically any vibrations to which the pipe 10 may be subjected, so that such vibrations will not be a source of annoyance by producing noises or the shaking of the building in which the pipe 10 is supported.

The construction of my invention may be widely varied and I do not wish to be limited to the specific arrangement which I have chosen for purposes of illustration.

I claim:

Means for supporting a pipe or the like, comprising a plurality of supports spaced along the length of said pipe, each of said supports comprising a supporting piece in contact with the pipe, a member connected to said piece and having a threaded stem, a top member having a central opening into which said threaded stem projects, a base, a solid resilient member and a metallic resilient member between said cap and said base and a nut on said threaded stem adapted to adjust the height of said piece from said base and to adjust the tension of said metallic resilient member.

CHARLES F. WENDLAND.

Witnesses:
JOHN H. FEDELER,
CHARLES ROSENBERG.

Copies of this patent may be obtained for five cents each, by addressing the "Commissioner of Patents, Washington, D. C."